United States Patent [19]

Matthiessen

[11] 4,106,428
[45] Aug. 15, 1978

[54] SAFETY SHIELD FOR FLANGE TYPE COUPLING

[76] Inventor: Roy A. Matthiessen, 30 Sandy Hill Rd., Westfield, N.J. 07090

[21] Appl. No.: 755,859

[22] Filed: Dec. 30, 1976

[51] Int. Cl.² .................. F16L 55/00; G01N 31/22
[52] U.S. Cl. ................ 116/114 P; 23/230 L;
                                    116/114 AM; 285/13
[58] Field of Search ............ 116/114 P, 114 AM;
                                    285/13, 45; 23/230 L

[56] References Cited
U.S. PATENT DOCUMENTS

| | | | |
|---|---|---|---|
| 2,249,867 | 7/1941 | Snelling | 116/114 AM |
| 2,601,840 | 7/1952 | Smith et al. | 116/114 P |
| 2,708,896 | 5/1955 | Smith et al. | 116/114 P |
| 3,850,451 | 11/1974 | Matthiessen | 285/45 X |

Primary Examiner—Daniel M. Yasich
Attorney, Agent, or Firm—Edward R. Weingram

[57] ABSTRACT

An improved shield for a pipe joint is described that includes an elongated body to be wrapped around a pipe coupling, formed from a strip of pliable fabric. One or more fabric liner strips is disposed within the body, and means are provided for separably connecting its ends together. The liner strips are loosely slidable relative to the body during wrapping of the assembly of the body and liner strips around the pipe coupling. One or more display means for monitoring the coupling integrity are held against the fabric body in assembled relation by a clear envelope means. The display means is formed from a sheet of chemically sensitive material having an indicating means thereon which, upon contact with leakage from the pipe coupling, provides a visual indication of such leakage.

12 Claims, 4 Drawing Figures

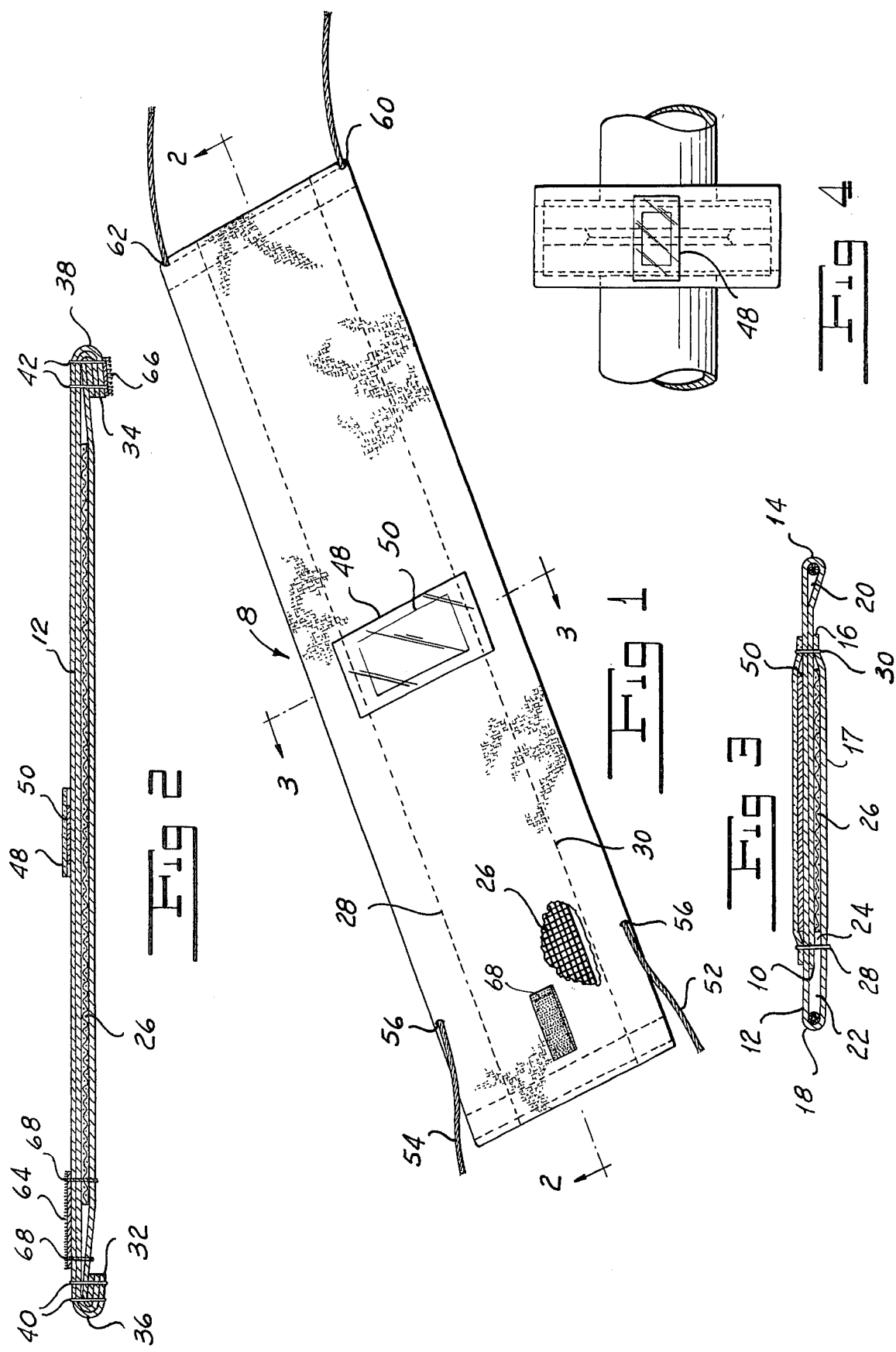

SAFETY SHIELD FOR FLANGE TYPE COUPLING

BACKGROUND OF THE INVENTION

1. Field of the Invention

This invention relates in general to a shield for intercepting leakage from pipe joints and, particularly, to achieve the following:

(1) When leaks occur in joints between coupling flanges causing the liquid being transported to squirt in a jet or stream, to divert the material so that a sprayout is prevented.

(2) To monitor leakage of liquids from the flanged pipe coupling being protected so as to serve as an indicator to workmen to alert them to apply corrective maintenance to the pipe joint.

(3) To increase protection from dangerous chemicals by making it possible to utilize flexible plastic woven cloths enjoying an improved level of resistance to chemical reaction not possessed by metals to which teachings have been limited to date.

2. Description of the Prior Art

In the past, safety shields for flanged pipe couplings have been taught by patents to Matthiessen, particularly U.S. Pat. Nos. 3,113,790; 3,527,479; and 3,850,451. Although such teachings were quite extensive as to the particular structure of a safety shield, their construction is highly specialized and is not capable of taking advantage of recent technological advances particularly the development of certain plastics which have a high degree of chemical inertness with respect to many hazardous substances. Also, the safety shields described were not capable of indicating the existence of a leaking flanged pipe coupling so that maintenance workers could take corrective action promptly. Instead, the leaking condition became known only when the dangerous chemicals overflowed the sides of the safety shield and thereby became visible.

SUMMARY OF THE INVENTION

To overcome the problems of the prior art, the present invention provides an improved shield for a pipe coupling capable of utilizing the most advanced developments in the field of plastic technology as well as providing display means for monitoring pipe coupling integrity. The shield has an elongated one-piece pliable plastic fabric body of a length and width dimensioned to be wrapped around a pipe coupling with its ends overlapped and having separate connection means for connecting said ends together. A pliable fabric liner strip is confined wholly within and extends centrally along said body. Retaining means are provided for holding the liner strip against unintended displacement. At least one display means is provided for monitoring pipe coupling integrity, the display means formed from a sheet of chemically sensitive material subject to color change. A clear envelope means is disposed over the display means to hold the display means and fabric body in assembled relation to the side of the shield body opposite the attachment of the liner strip so that a visual indication of pipe coupling integrity is provided by the display means. The type of fabric used for the outer cover and the reinforcing core is porous, so that any leaking material can penetrate slowly through the layers of fabric and make contact with the chemically sensitive material used as the display means so that color changes show the presence of leaking material.

Accordingly, it is an object of the present invention to provide a pipe flange safety shield which comprises a novel and improved construction including a pliable porous body capable of unprecedented resistance to dangerous chemicals, one or more porous liner strips, and a display with an indicator thereon signaling leakage of a hazardous nature.

Another object of the present invention is to provide a safety shield for a flanged pipe coupling having a liner reinforcing strip arranged in slidable contact with the shield body so as to cause the safety shield to conform to the shape of the flange coupling.

Still another object of the present invention is to provide a safety shield for a flanged pipe coupling which indicates the presence of a chemical leaking from the pipeline at the flange coupling by means of a color-changing member associated with a display on said shield.

Yet another object of the present invention is to provide a shield for flanged pipes which continuously, reliably, and safely indicates the integrity of the pipe joint it covers.

Other objects and advantages will be apparent from the following description of an embodiment of the invention, and the novel features will be particularly pointed out hereinafter in connection with the appended claims.

BRIEF DESCRIPTION OF THE DRAWINGS

FIG. 1 is a perspective view of an improved safety shield for a flanged pipe coupling being partially broken away to illustrate the liner strip and showing at the center thereof a display.

FIG. 2 is a longitudinal sectional view approximately on the plane of the line 2—2 of FIG. 1.

FIG. 3 is an enlarged transverse sectional view approximately on the plane of the line 3—3 of FIG. 1.

FIG. 4 is a front elevation of the liner completely applied to the coupling and showing the installed location of the display of FIG. 1.

DESCRIPTION OF THE PREFERRED EMBODIMENT

For the purposes of describing the features of the present invention, the improved safety shield is discussed in association with a well-known type of flanged pipe coupling commonly found in chemical and similar industries in which corrosive or otherwise hazardous fluids are handled. Such couplings normally include flanged sections with faces lying in planes normal to the longitudinal axis of the pipe. The faces of the flanged sections to be coupled are usually fastened together by bolts, with a gasket between the flange faces to form a liquid-tight joint.

Leaks frequently occur in joints between coupling flanges. When liquid is flowing through a coupling under high pressure, a leak or a weak spot in the joint produced, for example, by blowing out of a portion of a gasket, will sometimes cause the liquid to squirt in a jet or stream. Alternatively, leaks may occur intermittently at times of relatively larger pressure fluctuations in high pressure lines. Therefore, personnel in close proximity to the coupling flange, without certain knowledge of a leak, or without certain knowledge of the hazardous liquid that is leaking, are exposed to substantial dangers.

Accordingly, the purpose of the present invention is to provide a novel and improved shield to protect persons and objects in the vicinity of such a leaking pipe joint from being struck and possibly injured from liquid escaping as a result of a surprise leak due to gasket failure, thermal movement or vibration.

Referring now to FIGS. 1, 2 and 3, the safety shield, generally indicated at 8, comprises a one-piece porous elongated strip of material, having one end 10 inwardly folded under the over side 12 to form edge 14. The other end 16 is folded over the first end 10 to form a second edge 18 and the underside 17 of the safety shield. Edges 14 and 18 form pockets 20 and 22 respectively. The area of overlap between edges 10 and 16 provides a channel 24 for receiving a porous liner reinforcing strip or strips 26. The relative position of ends 10 and 16 and, therefore, the size of pockets 14 and 18 and channel 24 is determined by stitching lines 28 and 30. The distance between stitching lines 28 and 30 is great enough so that the channel formed is able to receive a liner reinforcing strip.

The ends of folded strip 32 and 34 are themselves folded over to form end edges 36 and 38 respectively, each secured by means of two rows of stitching 40 and 42 respectively. The thread used on the stitching can be of any suitable material having adequate tensile strength and capable of resisting the chemical being transported.

On the over side 12 of the main portion of the pipe shield 8, a clear envelope 48 of non-porous plastic, such as clear Teflon, clear vinyl, Aclar, or the like, is attached so as to be, upon installation to a pipe coupling, substantially centered upon and circumferentially disposed on the lower side of the pipe flange. The envelope is constructed to retain a display 50, which includes a chemically sensitive, color-changing material indicator to monitor leakage from the pipe coupling. The envelope, while holding the display against the porous pipe shield to monitor leakage from the pipe, protects the display from exposure to the existing external environmental conditions in which the pipe is disposed. While the indicators are largely applicable to monitoring acid or alkali leaks by changing color upon coming into contact with such chemicals, the display means are equally effective for any other liquid material for which the state of the art has made appropriate sensitized reacting papers or materials available.

Note that because both the elongated strip which is folded to form the body of the pipe shield, and the liner reinforcing strip are made from porous material, at least a small quantity of leaking liquid from the pipe joint should be able to penetrate the layers of material to reach the indicator and activate the indicator to display the presence of the leaked liquid within the pipe shield. Therefore, even if there is only a relatively small and/or intermittent leak from the pipe flange, personnel having visual access to the safety shield will be alerted to any occurrence of leakage at that joint.

Although the porosity of the safety shield allows for seepage of the leaking liquid to the indicator, the non-porous nature of the clear envelope prevents the indicator from being effected by ambient conditions, unrelated to leakage from the pipe joint.

Many indicators are presently marketed and are known to the persons skilled in the art. The chemical properties or formula need not be elaborated herein.

For the purposes of the present invention, it is desirable to monitor hydrogen ion concentrations from the moderately acidic level or value of pH6 and lower and to monitor alkalinity from the moderately alkaline level or value of pH8 and higher. Further, the invention makes it equally practicable to monitor other chemicals by the principal of chemical reaction by using applicable display means limited only by availability of appropriate sensitized reacting papers or materials by reason of the state of the art.

The safety shield of this invention is of the type having liner strips 26 and stitching disposed to prevent displacement of the liner relative to the body. The liner strip 26 is secured to the shield at one end only by stitching 68 which also secures the hook and pile fastener to the body. The remainder of the liner though held in constraints by stitching lines explained below, is to slide within the shield to conform to the shape of the shield as it is formed around the pipe joint to which it is applied. Optionally, the liner strips 26 and stitching may be disposed to permit the liner to freely slide relative to the body of the shield. The top and bottom ends of the liner strips 26 are secured within the body of the shield between the main portion of the body by the stitching 68. The liner strip is then prevented from substantial displacement relative to the body of the shield but still has sufficient capacity for movement to compensate for wrapping of the shield about the pipe without causing wrinkling or crumpling of the liner.

For the purpose of securing the shield in position on the coupling flanges, flexible fiberglass wires or chemically resistant plastic braid, serving as drawstrings, are inserted in pockets 20 and 22 respectively with their ends extending through apertures 56 and 58 in the body and out apertures 60 and 62 at the ends 38.

The wires are of sufficient length to permit the body to be wrapped around the flanges as shown in FIG. 4, with the wires extending outwardly from the body, and after which the ends of each wire are twisted or knotted together to firmly draw and hold the edge portions of the body inwardly of the coupling flanges and against the outer faces thereof, thus surrounding the pipe joint and also forming a receptacle for any minor liquid drippings from the joint. The end portions of the body are in overlapped relation to each other, and to hold them against separation, hook and pile fasteners 64 and 66 are attached to the body in spaced relation to the extremities of the body respectively.

From the foregoing, it can be seen that the present invention offers many distinct advantages. Because the entire safety shield is made from porous material, early leakage of relatively small quantities and/or intermittent occurrences can penetrate through the safety shield to actuate the indicator to alert workmen in the area of the dangerous condition being imposed by the pipe joint.

The construction of the safety shield while holding the components, including the reinforcing strip, in relatively secure relation to each other, allows sufficient flexibility and deformability, so that the pipe shield can be effectively wrapped around a pipe joint to restrict and retard the flow of spraying liquid in a large area if and when a pipe joint should fail.

The safety shield is relatively easy to install because of the hook-and-pile fasteners which will position the pipe shield about the flange until the flexible wires can be secured to fasten the shield in place.

It will be understood that various changes in the details, materials and arrangements of parts which have been herein described and illustrated in order to to explain the nature of the invention may be made by those skilled in the art within the principle and scope of the invention as expressed in the appended claims.

What is claimed is:

1. An improved shield having indicating means for a flanged pipe joint carrying a pressurized fluid, comprising:

an elongated porous pliable fabric body having an underside and an overside of a length and a width to be wrapped around a pipe coupling with its ends overlapped and with its underside adjacent the pipe coupling and its overside remote therefrom;

connection means for separably connecting said ends together;

a pliable porous liner reinforcing strip maintained at least at one end disposed between said underside and said overside confined wholly within the boundaries of said body and extending centrally longitudinally of said body;

retaining means for separably holding said liner strip in said body against displacement relative thereto;

at least one display means for monitoring pipe coupling integrity, said display means including chemically sensitive material having the indicating means thereon to change appearance in the presence of given substances; and clear envelope means having peripheral edges secured on said overside of said shield to surround said display means to hold said display means and fabric body in assembled relation relative to the pipe flange, so that said display means will provide a visual indication of leakage from the pipe joint that has seeped through the underside, pliable porous liner and overside and be protected by said clear envelope means from outside atmospheric or environmental conditions.

2. An improved shield for a pipe joint as described in claim 1, wherein said liner strip is attached internally to one end but free to slide and move so that it adjusts to the circumference of the pipe flange outer surface without restriction, thus conforming to the circumference without tension or buckling.

3. An improved shield for a pipe joint as defined in claim 1 wherein said indicating means is a colorant material responsive to a predetermined value of acid or alkali content in transported pipeline fluids.

4. An improved shield for a pipe joint as defined in claim 3 wherein said indicating means is responsive to the presence of acids (below Ph7) or alkalis (above Ph7).

5. An improved shield for a pipe joint as defined in claim 3, wherein said indicating means is responsive to an ambient hydrogen ion concentration above pH8.0.

6. An improved shield for a pipe joint as defined in claim 1 wherein said indicating means is responsive to a predetermined ambient nonionic liquid to form a visual monitor as to said liquid emerging from said pipe coupling.

7. An improved shield for a pipe joint as defined in claim 1 wherein said envelope means houses a plurality of indicating means.

8. An improved shield for a pipe joint as defined in claim 7 wherein said plurality of indicating means further comprises a related series of indicator means with each member of said series responsive to a differing predetermined substance.

9. An improved shield for a pipe joint as defined in claim 1 wherein said connecting means comprise:

hook and pile type fastening means disposed on opposite sides of said shield to engage upon wrapping said shield about a pipe joint; and drawstring-type lines to be pulled and knotted and thereby draw said shield about the pipe joint to form a receptacle about said pipe joint.

10. An improved shield for a pipe joint as defined in claim 6, wherein said connecting means comprise:

hook and pile type fastening means disposed on opposite sides of said shield to engage upon wrapping said shield about a pipe joint; and drawstring-type lines to be pulled and knotted, and thereby draw said shield about the pipe joint to form a receptacle about said pipe joint.

11. An improved shield for a pipe joint as defined in claim 1 wherein:

said elongated porous pliable fabric body is formed from one piece of material folded to form said underside and said overside; and said retaining means for separably holding said liner strip in said body comprise lines of stitching between said underside and said overside extending longitudinally along said body.

12. An improved shield for a pipe joint, comprising:

an elongated porous pliable fabric body having an underside and an overside and of a length and width to be wrapped around a pipe coupling with its ends overlapped and with its underside adjacent the pipe coupling and its overside remote therefrom;

connection means for separably connecting said ends together;

a pliable porous liner reinforcing strip disposed between said underside and said overside confined wholly within the boundaries of said body and extending centrally longitudinally of said body;

retaining means for separably holding said liner strip in said body against displacement relative thereto;

at least one display means for monitoring pipe coupling integrity, said display means including chemically sensitive material having indicating means thereon adapted to change appearance in the presence of given substances; and clear envelope means disposed on said overside of said shield to surround said display means and hold said display means and fabric body in assembled relation relative to the pipe flange so that said display means will provide a visual indication of leakage from the pipe joint and be protected by said clear envelope means from outside atmospheric or environmental conditions; and said elongated porous pliable fabric body is formed from one piece of material folded to form said underside and said overside; and said connecting means for separably connecting said ends together comprise:

hook and pile type fastening means disposed on opposite sides of said shield to engage upon wrapping said shield about a pipe joint; and drawstring-type lines to be pulled and knotted, and thereby draw said shield about the pipe joint to form a receptacle about said pipe joint;

said retaining means for separably holding said liner strip in said body against displacement relative thereto comprise:

stitching means extending between said underside and overside and passing through said liner strip at one end thereof; and lines of stitching between said underside and overside extending longitudinally along said body so that said liner strip is free to slide and move within said body to adjust to the circumfrence of the pipe flange outer surface without restrictions; and said indicating means is a colorant material responsive to transported pipe lines fluid.

* * * * *